(12) United States Patent
Saffer (10) Patent No.: US 7,729,906 B2
(45) Date of Patent: Jun. 1, 2010

(54) CLICKING NOISE DETECTION IN A DIGITAL AUDIO SIGNAL

(75) Inventor: Zsolt Saffer, Vienna (AT)

(73) Assignee: Koninklijke Philips Electronics NV, Eindhoven (NL)

( * ) Notice: Subject to any disclaimer, the term of this patent is extended or adjusted under 35 U.S.C. 154(b) by 1140 days.

(21) Appl. No.: 10/568,641

(22) PCT Filed: Aug. 18, 2003

(86) PCT No.: PCT/IB03/03356

§ 371 (c)(1),
(2), (4) Date: Feb. 16, 2006

(87) PCT Pub. No.: WO2005/017878

PCT Pub. Date: Feb. 24, 2005

(65) Prior Publication Data

US 2006/0287857 A1    Dec. 21, 2006

(51) Int. Cl.
*G10L 21/02* (2006.01)
*G10L 15/20* (2006.01)

(52) U.S. Cl. ........................... 704/226; 704/233
(58) Field of Classification Search .................. None
See application file for complete search history.

(56) References Cited

U.S. PATENT DOCUMENTS

| 4,420,694 A | 12/1983 | Yokota et al. |
| 5,586,192 A | 12/1996 | De Bejl et al. |
| 6,032,048 A | 2/2000 | Harless et al. |
| 6,311,092 B1 | 10/2001 | Yamada |

OTHER PUBLICATIONS

ISR: PCT/IB03/003356.

*Primary Examiner*—David R Hudspeth
*Assistant Examiner*—Brian L Albertalli
(74) *Attorney, Agent, or Firm*—Wolf, Greenfield & Sacks, P.C.

(57) ABSTRACT

In a method (M) to detect a noise signal (PS1, PS2, PS3) in a digital audio signal (EAS), it is provided that the audio signal (EAS) is divided into successive signal sections (SAS), and the energy contents of successive signal sections (SAS) are determined, and the energy contents of a signal section (SAS) are evaluated in relation to an energy threshold (ET), and that the occurrence of at least one high-energy signal section having an energy content above the energy threshold (ET), and the occurrence of at least one signal section (SAS) preceding the at least one high-energy signal section and having an energy content below the energy threshold (ET), and the occurrence of at least one signal section (SAS) following the at least one high-energy signal section and having an energy content below the energy threshold (ET) are detected, and that a quantity of signal sections (SAS) that precede the at least one high-energy signal section and a quantity of high-energy signal sections and a quantity of signal sections (SAS) that follow the high-energy signal section are counted.

18 Claims, 4 Drawing Sheets

CLICKING NOISE DETECTION IN A DIGITAL AUDIO SIGNAL

The invention relates to a method for detecting a noise signal in a digital audio signal.

The invention further relates to a device for processing a digital audio signal, which device is equipped with noise-signal detection means designed to detect a noise signal in the audio signal.

The invention further relates to a computer program product, which is suitable for detecting a noise signal in a digital audio signal.

The invention further relates to a computer, which implements the computer program product in accordance with the previous paragraph.

A method of this kind, of the generic type mentioned above in the first paragraph, and a device of this kind, of the generic type mentioned above in the second paragraph, and a computer program product of this kind, of the generic type mentioned above in the third paragraph, and a computer of this kind, of the generic type mentioned above in the fourth paragraph have been put into circulation by the applicant in connection with a voice recognition system, and are therefore known.

In the known voice recognition system, spoken language in the form of an audio signal is fed to the voice recognition system via a microphone, and digitized. The digital audio signal thereby obtained comprises speech signals to represent the voice, and background signals, which represent background noise, and further noise signals, wherein the noise signals may, in some circumstances, be similar to the speech signals and could also occur in close proximity to them. This digital audio signal is subjected to a spectral analysis and to further processing, as a result of which a representation of the digital audio signal in a so-called CEPSTRAL representation is obtained. The noise signals may be incorrectly detected as words that have not been spoken at all. Noise signals in a digital audio signal further have the disadvantageous effect that, on playback of an audio signal of this kind, a listener may become irritated. For this reason, the voice recognition system is equipped with noise-signal detection means, which are designed to detect noise signals for the purpose of further treatment of these detected noise signals.

In the known voice recognition system, the problem exists that noise signals, especially clicking noise signals, that occur during a relatively short time span can be detected only within relatively long quiet pauses in which the audio signal does not represent a speech signal, but only a background signal, as a result of which noise signals that occur in the immediate proximity or in the vicinity of speech signals cannot be detected at all.

It is an object of the invention to eliminate the problem outlined above in a method of the generic type mentioned above in the first paragraph, and in a device of the generic type mentioned above in the second paragraph, and a computer program product of the generic type mentioned above in the third paragraph, and a computer of the generic type mentioned above in the fourth paragraph, and to create an improved method and an improved device and an improved computer program product and an improved computer.

To achieve the object mentioned above, in a method in accordance with the invention, features in accordance with the invention are provided so that a method in accordance with the invention can be characterized in the manner specified below, namely:

A method to detect a noise signal in a digital audio signal, wherein the digital audio signal is divided into successive signal sections, and wherein the energy contents of successive signal sections are determined, and wherein the energy contents of a signal section are evaluated in relation to an energy threshold, and wherein the occurrence of at least one high-energy signal section having an energy content above the energy threshold, and the occurrence of at least one signal section preceding the at least one high-energy signal section and having an energy content below the energy threshold, and the occurrence of at least one signal section following the at least one high-energy signal section and having an energy content below the energy threshold are detected, and wherein a quantity of signal sections that precede the at least one high-energy signal section and a quantity of high-energy signal sections and a quantity of signal sections that follow the high-energy signal section are counted.

To achieve the object mentioned above, in a device in accordance with the invention, features in accordance with the invention are provided so that a device in accordance with the invention can be characterized in the manner specified below, namely:

A device to process a digital audio signal, which is equipped with noise-signal detection means, which are designed to detect a noise signal in the audio signal, wherein audio-signal subdivision means, which are designed to subdivide the audio signal into successive signal sections, are provided, and wherein energy-contents detection means, which are designed to determine the energy contents of successive signal sections, are provided, and wherein energy-contents evaluation means, which are designed to evaluate the energy contents of a signal section in relation to an energy threshold, are provided, and wherein occurrence detection means, which are designed to detect the occurrence of at least one high-energy signal section having an energy content above the energy threshold, and to detect the occurrence of at least one signal section preceding the at least one high-energy signal section and having an energy content below the energy threshold, and to detect the occurrence of at least one signal section following the at least one high-energy signal section and having an energy content below the energy threshold are provided, and wherein counting means, which are designed to count a quantity of signal sections that precede the at least one high-energy signal section and to count a quantity of high-energy signal sections and to count a quantity of signal sections that follow the at least one high-energy signal section, are provided.

To achieve the object mentioned above, in a computer program product in accordance with the invention, the computer program product can be loaded directly into a memory of a computer, and comprises software code sections, wherein the method in accordance with the invention can be implemented with the computer when the computer program product is implemented on the computer.

To achieve the object mentioned above, in a computer in accordance with the invention, the computer is equipped with a processor unit and an internal memory, which implements the computer program product in accordance with the paragraph quoted above.

By virtue of the provision of the measures in accordance with the invention, the advantage is obtained that clicking noise signals can be detected in the most reliable possible manner, and that this detection takes place on the basis of a representation of the audio signal in terms of time, using an energy pattern established in this representation in terms of time and taking account of an existence of this energy pattern in terms of time, which has the result that complex transformation methods for transforming the representation of the audio signal in terms of time into a representation other than a representation in terms of time may be completely dispensed with, and therefore the invention can be realized with the availability of only a relatively low calculation power, and a fast and simple detection of these noise signals is assisted.

In a solution in accordance with the invention, it has further proved advantageous if the features as claimed in claim 2 are provided. This gives rise to the advantage that an evaluation of the energy contents of signal sections in a standardized representation using decibels as the unit is relatively simple to perform.

In a solution in accordance with the invention, it has further proved advantageous if the features as claimed in claim 3 are provided. This gives rise to the advantage that the energy threshold is determined quasi-continuously and therefore always in the correct ratio to the actual signal level of the audio signal in each case, as a result of which an incorrect detection, or no detection at all, of clicking noise signals owing to an incorrect definition or approximation of the actual energy threshold is virtually ruled out.

In a solution in accordance with the invention, it may, for example, be provided that a duration of the signal sections is selected to be between 1 millisecond and 40 milliseconds. It has, however, proved especially advantageous if the features as claimed in claim 4 are provided, since, as a result, diverse properties of the audio signal can be reacted to in a preferred value range in the most dynamic manner possible, i.e. by signal sections of varying lengths.

In a solution in accordance with the invention, it has proved especially advantageous if the features as claimed in claim 5 are provided. This gives rise to the advantage that this uniform time resolution of the audio signal assists a precise detection of a clicking noise signal.

In a solution in accordance with the invention, it has proved especially advantageous if the features as claimed in claim 6 are provided. This gives rise to the advantage that an unambiguous detection of a clicking noise signal in the audio signal, avoiding an incorrect detection of useful signals similar to it, is assured, since, in a useful signal exhibiting speech, a pause comprising n signal sections virtually does not occur within a word, and since an energy pattern comprising m and l signal sections rules out an end of a spoken word, known as a half-syllable. In a solution in accordance with the invention, provision may also be made to establish whether 1 lies in the range between 1 and 9, and to establish whether m is equal to or greater than a value from the range between 6 and 11, and to establish whether n is equal to or greater than a value from the range between 27 and 38.

In a solution in accordance with the invention, it has further proved advantageous if the features as claimed in claim 7 are provided. This gives rise to the advantage that even clicking noise signals that occur repeatedly are distinguishable in a simple, reliable manner from useful signals in the audio signal, and therefore reliably detectable.

In a solution in accordance with the invention, it has further proved advantageous if the features as claimed in claim 9 are provided. This gives rise to the advantage that noise signals can be removed from the audio signal virtually in realtime, and therefore an audio signal free from noise signals can be made available.

The above-mentioned aspects and further aspects of the invention are explained below.

The invention will be further described with reference to examples of embodiments shown in the drawings, to which, however, the invention is not restricted.

Figure 1:
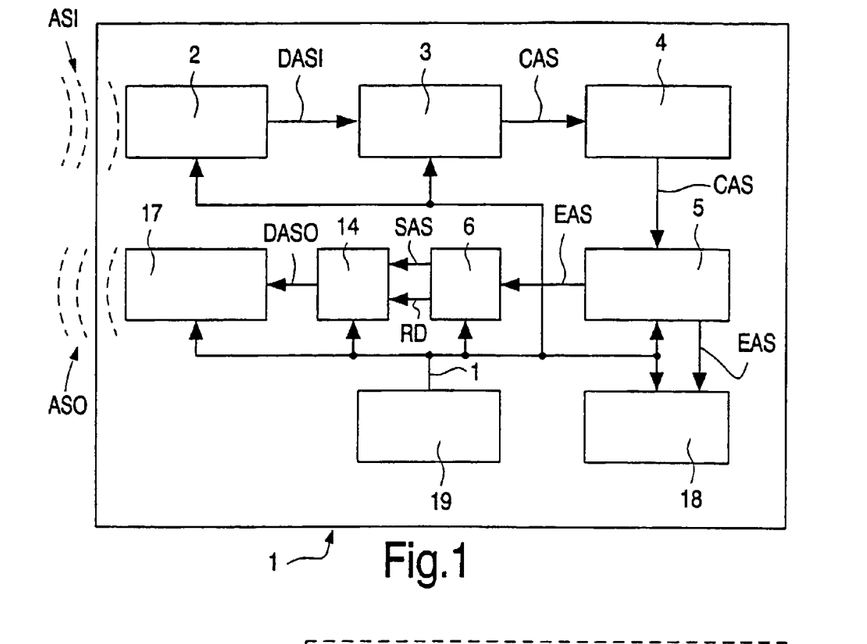
FIG. 1 shows, in a schematic manner, in the form of a block circuit diagram, a device in accordance with a first embodiment example of the invention.

FIG. 1 shows a device 1 to process a digital audio signal DASI, which device 1 is realized by a mobile dictation machine.

Figure 3:
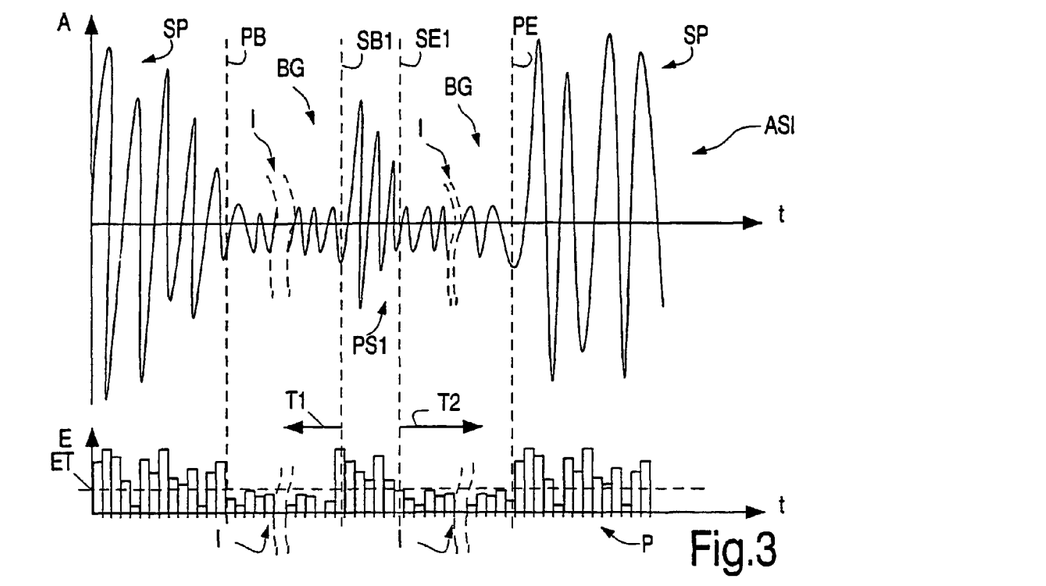
FIG. 3 shows, in the form of two diagrams, an audio signal exhibiting a clicking noise signal, which audio signal can be processed with the aid of the device in accordance with the invention, and a sequence of energy contents of the audio signal corresponding with signal sections of the audio signal.
Figure 4:
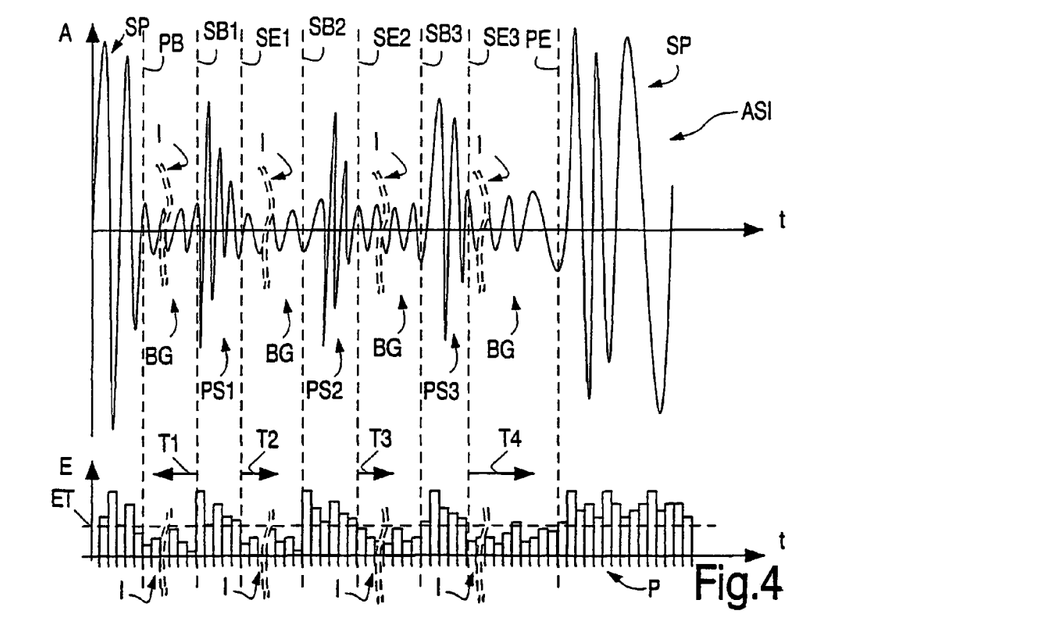
FIG. 4 shows, by analogy with FIG. 3, an audio signal exhibiting multiple clicking noise signals, and a sequence of energy contents.

The digital audio signal DASI can be generated from an acoustic input audio signal ASI, which is shown in the upper diagram of FIG. 3 during a first time range, wherein the amplitude A of audio signal ASI is shown as a function of time t. The audio signal ASI is formed by a speech signal SP and a background signal BG occurring during a pause within the speech signal SP, and a single noise signal PS occurring during a relatively short time span during the pause. A start of the pause is marked by a time mark PB. An end of the pause is marked by a time mark PE. A start of noise signal PS1 is marked by a time mark SB1. An end of noise signal PS1 is marked by a time mark SE1. In the upper diagram in FIG. 4 is shown the input audio signal ASI in a manner analogous to the upper diagram in FIG. 3, during a second time range. By contrast with the first time range, following on from noise signal PS1, two further noise signals PS2 and PS3, which are similar in structure to noise signal PS1, occur in the second time range. Noise signal PS2 is delimited by time marks SB2 and SE2. Noise signal PS3 is delimited by time marks SB3 and SE3. Noise signals PS1 or PS3 and PS3 respectively have been generated on operation of the mobile dictation machine. It should be mentioned, however, that noise signals PS1, PS2 and PS3 of this kind can also be generated by events in the vicinity of the dictation machine. For reasons of scale, audio signal ASI is not shown in FIG. 3 and FIG. 4 for multiple time ranges I.

Device 1 is equipped with reception means 2, which is designed to receive the input audio signal ASI. Reception means 2 is equipped with a microphone, which is not shown in FIG. 1, and with a reception amplifier with an automatic gain control, which is not shown in FIG. 1, and with an analog/digital converter, which is not shown in FIG. 1. The reception means 2 is designed to generate and deliver a digital audio signal DASI representing the input audio signal ASI, which digital audio signal DASI is present in a pulse-code modulation coding, PCM for short, in sixteen bit format.

Device 1 is further equipped with compression means 3, which is designed to receive the digital audio signal DASI and to generate and deliver a compressed audio signal CAS, which compressed audio signal CAS has a data volume that is reduced by comparison with digital audio signal DASI. In the present case, compression means 3 is designed to generate a compressed audio signal CAS, which audio signal CAS has, in the present case, been compressed in accordance with the "Code Excited Linear Prediction (CELP)" compression standard. It should, however, be mentioned at this point that any other compression method may also be used, or that the digital audio signal DASI may be further processed compression-free.

Compression means 3 is further designed for write access to first storage means 4, which first storage means 4 is provided to store the compressed audio signal CAS, so the compressed audio signal CAS can be stored in first storage means 4.

Device 1 is further equipped with decompression means 5, which is designed for read access to first storage means 4 and, during access to first storage means 4, to read compressed audio signal CAS stored in first storage means 4. Decompression means 5 is further designed to decompress the compressed audio signal CAS and to generate and deliver a decompressed audio signal EAS.

Figure 2:
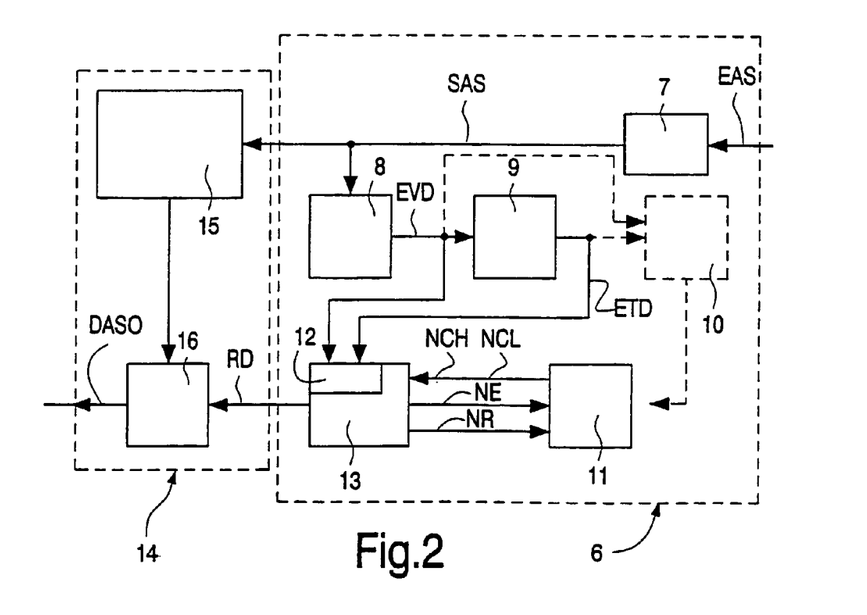
FIG. 2 shows, in a manner analogous to FIG. 1, an invention-relevant detail of the device in accordance with FIG. 1.

Device 1 is further equipped with noise-signal detection means 6, which is designed to receive the digital, decompressed audio signal EAS and to detect, in realtime, the noise signal PS1 or the noise-signal train PS1, PS2 and PS3 in audio signal EAS.

For this purpose, noise-signal detection means 6 is equipped with audio-signal subdivision means 7, which is designed to subdivide audio signal EAS into successive signal sections SAS, which signal sections SAS represent audio signal ASI for a time span P in each case. A multiplicity of time spans P is drawn along time axis t in FIG. 3 and in FIG. 4. In the present case, time span P is selected to be five milliseconds. It should, however, be mentioned that other values can also be selected for P, such as between two and ten milliseconds, which, however, as is clear to a person skilled in the art, could have an effect on the quality of detection of the noise signals and/or an effect on other parameters influencing the detection of noise signals PS1 and PS2 or PS3 respectively, to which parameters we refer below in greater detail.

The noise-signal detection means 6 is further equipped with energy-contents determination means 8, which is designed to determine the energy contents of successive signal sections SAS, wherein the energy contents of a signal section SAS are determined in accordance with the formula $$E = 10\log_{10}\left(\frac{1}{N}\sum_{k=1}^{N} S_k^2\right)$$

in the unit decibels (dB), wherein Sk represents the signal amplitude of the k-th signal section SAS, and wherein N represents the total quantity of signal amplitudes $S_k$ within signal section SAS. The energy-contents determination means 8 is further designed to generate and deliver energy-contents data EVD representing the determined energy contents. The determined energy contents of signal sections SAS are shown in the lower diagrams in FIG. 3 and FIG. 4 respectively, in the form of a bar chart in each case.

The noise-signal detection means 6 is further equipped with energy-threshold determination means 9, which is designed to determine an energy threshold ET, wherein the energy threshold ET is determined continuously on the basis of energy-content data EVD. In detail, the determination of energy threshold ET is based on a basic method and on a refinement method, both of which methods are described below in greater detail.

Figure 5:
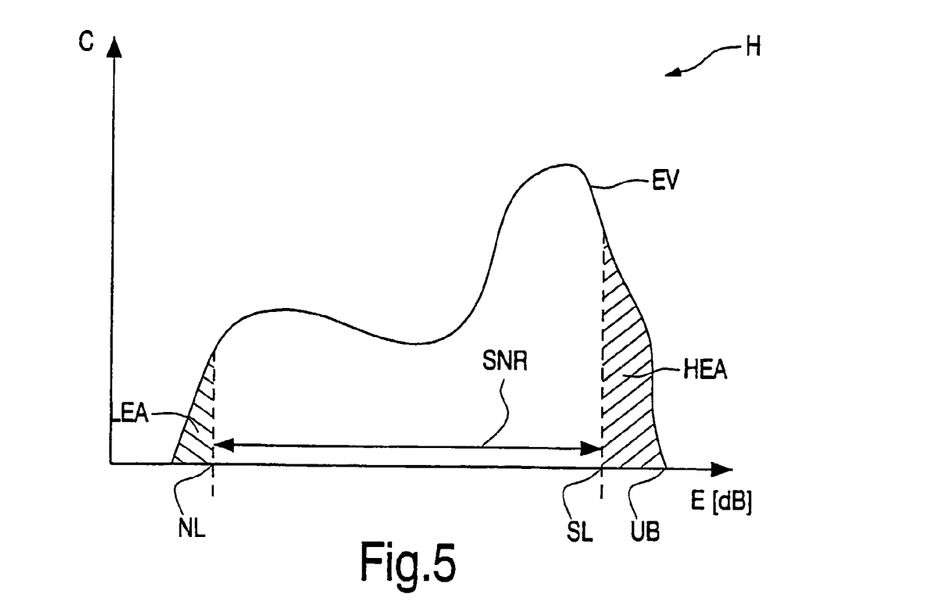
FIG. 5 shows, in the form of a diagram, a histogram of the energy contents of the audio signal in accordance with FIG. 3.

With the basic method, within a normal time slot of six seconds, through which, metaphorically speaking, the energy-contents data EVD is pushed, a histogram H of the energy contents of all signal sections SAS occurring within the normal time slot is firstly created, as shown in FIG. 5. It should, however, be mentioned at this point that values other than the six seconds may also be provided for the normal time slot. In histogram H, the energy contents are plotted along the abscissa, wherein, in accordance with the selected PCM sixteen bit format, an energy-contents top limit UB lies at 90 dB. A step-like characteristic of the edge curve thus obtained for the area of histogram G is approximated by a continuously proceeding envelope curve EV. Below the envelope curve, a low-energy area LEA and a high-energy area HEA are defined in such a way that each of the areas exhibits ten percent of the area below the envelope curve, wherein it should again be mentioned at this point that, instead of ten percent, other values, such as values between five and fifteen percent, may also be provided. The positions of the respective delimitation lines of the two areas LEA and HEA give rise to noise-signal level NL and useful-signal level SL. The ratio between useful-signal level SL and noise-signal level NL, referred to below as SNR, relating to the specialist expression "Signal-to-Noise Ratio", is calculated as the difference between the useful-signal level SL and the noise-signal level NL. Further used is a parameter designated "Noise Offset", which takes account of an anticipated minimum energy bandwidth of the noise, and which, in the present case, exhibits a value of four decibels. A further parameter designated "Energy Factor" represents an anticipated noise component of the overall SNR range, and, in the present case has a value of 0.34. Using the above-mentioned parameters, the energy threshold ET can be calculated as follows, as a function of the condition applicable in each case:

IF(SNR>Noise Offset)ET=NL+Energy Factor*SNR

ELSE ET=NL+Noise Offset

It should be mentioned at this point that, at the start of a determination of the energy threshold ET, i.e. at an instant at which a sufficient number of energy contents have not yet been determined within the normal time slot in order to determine the energy threshold ET, a minimum time slot of one second is used instead of the normal time slot in order to avoid a resultant significant delay in the determination of energy threshold ET using the normal time slot.

In a refinement method, on the assumption that, with the basic method, the duration of the normal time slot is too long to react to rapid changes in noise-signal level NL, the noise-signal level NL is determined from the energy contents most recently determined within a short time slot of one hundred milliseconds, wherein a mean value of the energy contents is calculated in accordance with the formula $$NL = \frac{1}{M}\sum_{i}^{M} EVD_i,$$

wherein the energy-contents data $EVD_i$ represents the energy contents within the short time slot, and wherein M is the quantity of energy-contents data $EVD_i$ within the short time slot. In accordance with the refined determination of the noise-signal level NL, determination of the energy threshold ET takes place as in the basic method, wherein the formulae specified in the basic method are used, and wherein SNR is determined in accordance with the basic method. The energy-threshold determination means 9 is further designed to deliver the energy threshold ET determined in accordance with the basic method or in accordance with the refinement method in the form of energy-threshold data ETD. The energy-threshold ET determined by the particular method is entered in the lower diagrams in FIG. 3 and FIG. 4 respectively, wherein changes in the energy threshold ET occurring over time are not explicitly shown.

In determining the energy threshold ET, the refinement method is always used, and the basic method is used, starting from time mark SE1, in the direction of arrow T2 and, if applicable, also starting from time mark SE2, in the direction of arrow T3, and, starting from time mark SE3, in the direction of arrow T4, for, in each case, a maximum of thirty signal sections SAS, which represent a background signal BG, in order to stabilize the refinement method.

The noise-signal detection means 6 is further equipped with counting means 11. Counting means 11 is designed to count a quantity of adjacent, successive high-energy signal sections exhibiting an energy content above energy threshold ET, and to generate and deliver high-energy numerator-count data NCH representing this quantity. For the audio signals AIS shown in FIG. 3 and FIG. 4, this situation exists between time marks SB1 and SE1, SB2 and SE2 and SB3 and SE3 respectively.

The counting means 11 is further designed to count a quantity of signal sections SAS, which precede the at least one high-energy signal section, and which exhibit an energy content below the energy threshold ET. For the audio signals ASI shown in FIG. 3 and FIG. 4, this situation exists starting to the left of time mark SB1 and extending in the direction of an arrow T1. Counting means 11 is further designed to count a quantity of signal sections, which follow the at least one high-energy signal section, and which exhibit an energy content below the energy threshold. For the audio signals ASI shown in FIG. 3 and FIG. 4, this situation exists starting at time mark SE1 and extending in the direction of an arrow T2. For the audio signal ASI shown in FIG. 4, this situation further exists starting at time mark SE2 and extending in the direction of an arrow T3, and starting at time mark SE3 and extending in the direction of an arrow T4. In both cases, i.e. in the case of signal sections SAS preceding a high-energy signal section or in the case of signal sections SAS following a high-energy signal section, the relevant quantity of signal sections SAS is represented physically by low-energy numerator-count data NCL, which, however, can be divided logically, i.e. as regards their occurrence in terms of time, into numerator-count data $NCL_{PRE}$ and $NCL_{POST}$.

Accordingly, counting means 11 is realized in an advantageous manner by only two numerators, which are not shown in FIG. 2, wherein a first numerator is provided to generate the low-energy numerator-count data NCL, and wherein a second numerator is provided to generate the high-energy numerator-count data NCH, and wherein the counting means 11 is designed to receive and to process a numerator signal NE, which serves to communicate to counting means 11 which of the two numerators is to be incremented. The numerator-count data NCH or NCL present at the respective numerators is permanently available. Counting means 11 is further designed to receive a numerator-reset signal NR, which effects an erasure of the numerator status represented by the numerator-count data NCH and NCL.

The noise-signal detection means 6 is further equipped with energy-contents evaluation means 12, which is designed to receive the energy-contents data EVD and the energy-threshold data ETD determined in each case, and which is designed to evaluate in each case the energy contents of a signal section SAS referred to the applicable energy threshold ET. The energy-contents evaluation means 12 is provided to interact with occurrence-detection means 13. The occurrence-detection means 13 is designed to generate and to deliver the numerator signal NE and the numerator-reset signal NR. The occurrence-detection means 13 is further designed to detect, with the aid of an evaluation result from energy-contents evaluation means 12, the occurrence of at least one high-energy signal section, such as between time mark SB1 and SE1, and to detect the occurrence of at least one signal section SAS preceding the at least one high-energy signal section and exhibiting an energy content below the energy threshold ET, such as to the left of time mark SB1, and to detect the occurrence of a signal section SAS following the at least one high-energy signal section and exhibiting an energy content below the energy threshold ET, such as to the right of time mark SE1.

The occurrence-detection means 13 is further designed to generate and to deliver occurrence-detection data RD in the event that the occurrence of the energy pattern described in the preceding paragraph has been detected in signal sections SAS and the quantity of groups of signal sections SAS forming the energy pattern in each case corresponds to a hypothesis, so a clicking noise signal is present. Here, it is established during checking of the hypothesis whether the energy contents of m successive signal sections SAS, which are represented by low-energy numerator-count data $NCL_{PRE}$ and which precede the high-energy signal sections, fall below the energy threshold ET, wherein m is equal to or greater than nine. It is further established whether the energy contents of l successive high-energy signal sections, which are represented by high-energy numerator-count data NCH, exceed the energy threshold ET, wherein l lies between three and seven. It is further established whether the energy contents of n successive signal sections, which are represented by low-energy numerator-count data $NCL_{POST}$ and which follow the high-energy signal sections, fall below the energy threshold ET, wherein n is equal to or greater than thirty. This hypothesis, which can be applied to the audio signals ASI shown in FIG. 3 and FIG. 4, can be formulated mathematically in accordance with the condition specified below:

$(NCL_{PRE} >= 9)$ AND $(3 <= NCH <= 7)$ AND $(NCL_{POST} >= 30)$.

For the situation shown in FIG. 4, noise-signal detection means 6 is designed to detect repeatedly occurring noise signals PS1, PS2 and PS3 respectively. Here, the hypothesis is expanded to the effect that it is established whether, following on from high-energy signal sections, for example, following signal sections SAS of noise signal SP1 or noise signal SP2, during thirty signal sections following these high-energy signal sections, which exhibit an energy content below the energy threshold, the energy contents of further high-energy signal sections, as is the case during, for example, noise signals PS2 and PS3, exceed the energy threshold ET. This hypothesis, thus expanded, which can be applied to the audio signals ASI shown in FIG. 3 and FIG. 4, can be formulated mathematically in accordance with the condition specified below:

$(NCL_{PRE} >= 9)$ AND

-continued $$\left(\sum_{i=1}^{3} NCH_i >= 3\right) \text{ AND}$$

$(NCH_i <= 7, \forall i, 1 <= i <= 3) \text{ AND}$ $(NCL_{POST,i} < 30, \forall i, 1 <= i <= 2) \text{ AND}$ $(NCL_{POST,3} >= 30).$ For clarification, it should be mentioned at this point that $NCH_1$ represents the quantity of high-energy signal sections during noise signal PS 1, and that $NCH_2$ represents the quantity of high-energy signal sections during noise signal PS2, and that $NCH_3$ represents the quantity of high-energy signal sections during noise signal PS3. It should further be clarified that $NCL_{PRE}$ represents the quantity of signal sections SAS preceding the $NCH_1$ high-energy signal sections. It should further be clarified that $NCL_{POST,1}$ represents the quantity of signal sections SAS occurring between noise signals PS1 and PS2, and that $NCL_{POST,2}$ represents the quantity of signal sections SAS occurring between noise signals PS2 and PS3, and that $NCL_{POST,3}$ represents the quantity of signal sections occurring after noise signal PS3, which exhibit an energy content below energy threshold ET. It should also be clarified that i represents the quantity of noise signals PS1, PS2 and PS3 within the pause, and that the quantity of further noise signals PS2 and PS3 etc. occurring after the first noise signal PS1 is limited to twenty five. It should, however, be mentioned that i may also be assigned to a different maximum value, depending on the particular application case.

To this end, energy-contents evaluation means 12 and occurrence-detection means 13 are realized by a so-called "State Machine", which is designed to check continuously, on the basis of the energy-contents data EVD and the energy-threshold data ETD and the two numerator-count data NCL and NCH, the above-cited conditions and, depending on the results of this check, to remain in one of its states or to change its state. The states hereby essentially represent the fact that the above-described hypothesis obtains or that this hypothesis does not obtain. In the event that the hypothesis obtains, a further distinction is made between three further states, wherein one state represents a before-pause, formed by background signal BG, before the first noise signal PS1, and wherein a further state represents the high-energy signal sections during one of noise signals PS1, PS2, PS3, and wherein a further state represents intermediate pauses, formed by background signal BG, between time marks SE1 and SB2 or SE2 and SB3, or an after-pause between time marks SE3 and PE. The state machine is designed to generate and deliver numerator signal NE in the event that it remains in a state. The state machine is further designed to generate and deliver the occurrence-detection data RD as the result of a change in state, if the above-mentioned conditions for detection of a clicking noise signal PS1 or a sequence of clicking noise signals PS1, PS2, PS3 are wholly fulfilled, and, in the event that it is not a clicking noise signal detectable in accordance with the hypothesis, to generate and deliver the numerator-reset signal NR.

In accordance with the above information, a method for the detection of noise signal PS1 in accordance with FIG. 3 or a sequence of noise signals PS1, PS2, PS3 in accordance with FIG. 4 can be implemented in digital audio signal EAS with the aid of device 1, wherein digital audio signal EAS is divided into successive signal sections SAS, and wherein the energy contents of successive signal sections SAS are determined, and wherein the energy contents of a signal section SAS referred to an energy threshold ET are evaluated, and wherein the occurrence of at least one high-energy signal section exhibiting an energy content above the energy threshold ET and the occurrence of at least one signal section SAS preceding the at least one high-energy signal section and exhibiting an energy content below energy threshold ET, and the occurrence of at least one signal section SAS following the at least one high-energy signal section and having an energy content below the energy threshold ET is detected, and a quantity of signal sections SAS that precede the at least one high-energy signal section and a quantity of high-energy signal sections and a quantity of signal sections SAS that follow the high-energy signal section are counted.

Figure 7:
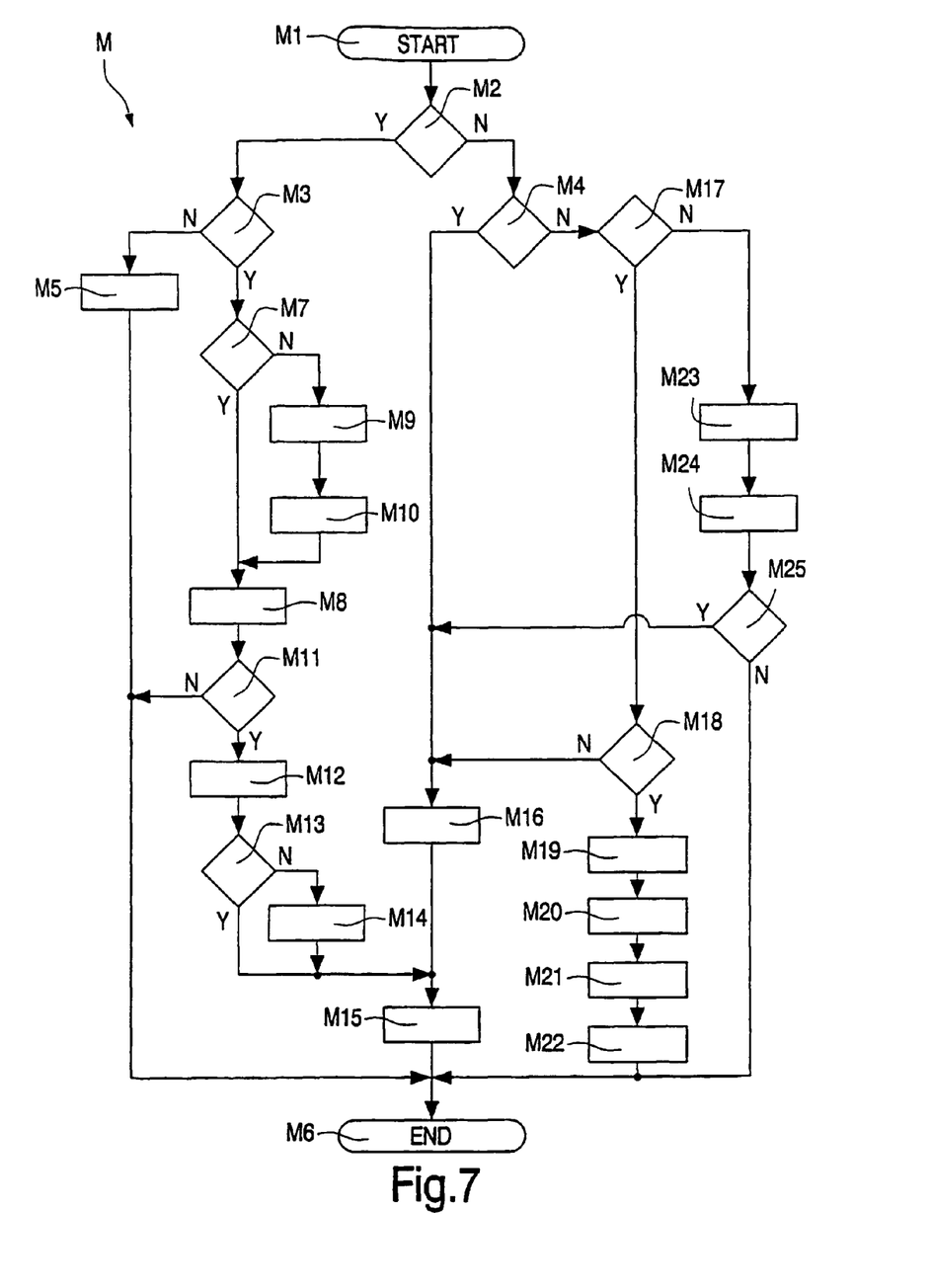
FIG. 7 shows, in the form of a flowchart, a method in accordance with the invention for detecting clicking noise signals in a digital audio signal.

Below, the method M for the detection of noise signal PS1 or noise signals PS1, PS2 and PS3, which can be implemented with the aid of device 1, is explained in detail with reference to the flowchart shown in FIG. 7.

To this end, the variables specified below, which are necessary for detection of noise signals PS1 or PS1, PS2 and PS3, are firstly introduced, the values of which are amended during implementation of method M. A first variable E represents the energy contents of the particular signal section SAS. A second variable CL represents the quantity of high-energy signal sections, wherein this quantity corresponds to the high-energy numerator-count data NCH. The third variable SL represents the quantity of signal sections SAS, the energy value of which lies below the energy threshold ET, wherein this quantity corresponds to the low-energy numerator-count data NCL. A fourth variable CLACCU represents an accumulated quantity of high-energy signal sections in the event that, during a pause, individual high-energy signal sections or groups of these high-energy signal sections repeatedly occur. A fifth variable RC represents a repetition numerator value for counting the quantity of repeatedly occurring noise signals PS2 or PS3. A sixth variable SLMAYBERESET represents a logic value for reaching a decision. At the start of method M, the numerical variables CL, SL, CLACCU and RC are assigned a value of zero. The logic variable SLMAYBERESET is assigned the logic value False.

The parameters specified below, which are used in the method for sequence control, are also introduced. A first parameter SBEGIN represents the minimum quantity of signal sections SAS that represent the background signal BG before the first high-energy signal section occurs, wherein, in the present case, the value nine is provided. A second parameter SEND represents the minimum quantity of signal sections SAS that represent the background signal BG and occur after the last high-energy signal section belonging to a noise signal PS1 or a sequence of noise signals PS1, PS2 or PS3, wherein, in the present case, the value thirty is provided. A third parameter CMIN represents the minimum quantity of high-energy signal sections required for detection of a noise signal PS1, PS2 or PS3, wherein, in the present case, the value three is provided. A fourth parameter CMAX represents the maximum quantity of high-energy signal sections required for detection of a noise signal PS1, PS2 or PS3, wherein, in the present case, the value seven is provided. A fifth parameter MAXREP represents the maximum permitted quantity of repeatedly occurring high-energy signal sections, wherein, in the present case, the value twenty-five is provided.

The implementation of method M for every signal section SAS starts at a block M1 as soon as the digital audio signal EAS has been divided into successive signal sections SAS, and the energy contents have been determined for the particular signal section SAS and are represented by the variable E, and the energy threshold ET applicable in the particular case is available.

At a block M2, evaluation takes place of the energy contents of the particular signal section SAS referred to energy threshold ET. In the event that it is established at block M2 that E lies below energy threshold ET, progression is to a block M3, which means that a signal section SAS representing background signal BG in the pauses between time marks PB and PE is present.

At block M3, a check is made as to whether CL is greater than zero.

In the event that CL is not greater than zero, this means that a pause has been initiated. Progression in this case is to a block M5, at which SL is increased by a value of one. Method M is then terminated at a block M6.

In the event that CL is greater than zero, this means that a pause after a noise signal detectable in accordance with the hypothesis is involved, for which noise signal at least one of the conditions of the hypothesis exists. Progression in this case is to a block M7, at which a check is made as to whether SLMAYBERESET is equal to False.

In the event that SLMAYBERESET is equal to True, this means that the first signal section SAS after a noise signal PS1, PS2 or PS3, detectable in accordance with the hypothesis, between time marks SE1 and SB2, SE2 and SB3 or SE3 and PE may be involved. Progression is to a block M9, at which SL is assigned the value zero in order to enable the recounting of signal sections SAS in the next pause. Subsequently, the method is continued at a block M10, at which SLMAYBERESET is assigned False. Subsequently, method M is continued at block M8.

In the event that SLMAYBERESET is equal to False, meaning that a signal section SAS other than the first one of the pause between time marks SE1 and SB2, SE2 and SB3 or SE3 and PE is involved, progression is to a block M8, at which SL is increased by the value of one.

After block M8, method M is continued at a block M11, at which a check is made as to whether SL is equal to SEND. In the event that this discontinuation condition is not fulfilled, progression is to block M6. In the event that SL is equal to send, progression is to a block M12, at which CLACCU is increased by the value of CL. After block M12, the method is continued at a block M13.

At block M13, a check is made as to whether CLACCU is less than CLMIN.

In the event that CLACCU is not less than CLMIN, this means that a noise signal PS1 or a noise-signal sequence PS1, PS2 and PS3 has been detected, and progression is to a block M14. At block M14, the occurrence-detection data RD is generated and delivered. Subsequently, method M is continued at a block M15, at which CL, CLACCU and RC are assigned the value of zero and at which SLMAYBERESET is assigned the value False. The method then ends at block M6.

In the event that CLACCU is less than CMIN, method M is continued at block M15.

If it is the case at block M2 that E is not less than ET, this means that a signal section SAS that represents either a speech signal SP or a noise signal PS1, PS2 or PS3 is present. In this case, progression is to a block M4.

At block M4, a check is made as to whether CL has a value of zero and whether SL is less than SBEGIN.

In the event that the check condition is fulfilled at block M4, this means that the pause during which background signal BG was present was not long enough, and that the signal section SAS is not a noise signal PS1, PS2 or PS3 detectable in accordance with the hypothesis. In this case, progression is to a block M16, at which SL is assigned the value zero. Method M is then continued at block M16. The continuation of method M in accordance with blocks 15 and 16 corresponds to the generation of the numerator-reset signal NR.

In the event that the check condition is not fulfilled at block M4, this means that a noise signal PS1, PS2 or PS3 detectable in accordance with the hypothesis may be involved. As a result, progression is to a block M17.

At block M17, a check is made as to whether CL is greater than zero and whether SLMAYBERESET is equal to False.

In the event that the check condition is fulfilled at block M17, this means that, with regard to signal section SAS, this may be the start of one of the noise signals PS2 or PS3, and progression is to a block M18.

At block 18, a check is made as to whether RC is less than MAXREP.

In the event that RC is not less than MAXREP, this means that a valid noise signal PS2 or PS3, i.e. one that can be detected in accordance with the hypothesis, is not involved, and progression is to block M16.

In the event that RC is less than MAXREP, this means that one of the noise signals PS2 or PS3 following after the first noise signal PS1 may be involved, and progression is to a block M19. At block 19, RC is increased by the value of one, and method M is continued at a block M20. At block M20, CLACCU is increased by the value CL, and method M is continued at a block M21. At block M21, CL is assigned the value of one, and the method is continued at a block M22. At block M22, SLMAYBERESET is assigned logic value True, and the method is terminated at M6.

In the event that the check condition is not fulfilled at block M17, this means that, with regard to signal section SAS, this may be the start of the first noise signal PS1, or a signal section SAS within one of the noise signals PS1 or PS2 or PS3 may be involved, wherein this is not the first signal section SAS of one of noise signals PS1 or PS2 or PS3. In this case, progression is to a block M23. At block M23, CL is increased by the value of one, and method M is continued at a block M24. At block M24, SLMAYBERESET is assigned the logic value True, and method M is continued at a block M25.

At block M25, a check is made as to whether CL is greater than CMAX. In the event that CL is greater than CMAX, this means that the duration of the high-energy signal sections was too long, and therefore no noise signal PS1 or PS2 or PS3 can be present, and progression is to block M16. In the event that CL is not greater than CMAX, progression is to block M6, and method M is terminated at block M6.

In conclusion, it should be mentioned in connection with method M that, if the condition is fulfilled at block M3, the duration of the before-pause before a noise signal was long enough, and that the quantity of high-energy signal sections was not greater than CMAX, and that the quantity of repeatedly occurring noise signals lies within the permitted range.

The device 1 shown in FIG. 1 is further equipped with supply means 14, which is designed to supply and deliver a noise-signal-free audio signal DASO, taking account of an individual detected noise signal PS1 or a sequence of multiple detected noise signals PS1, PS2 and PS3. To this end, supply means 14 is equipped with second storage means 15, which is designed for the temporary storage of a multiplicity of signal sections SAS that can be generated with the aid of the audio-signal subdivision means 7. The supply means 14 is further equipped with resetting means 16, which is designed to receive the occurrence-detection data RD. The resetting means 16 is further designed for the purpose of reading the temporarily stored signal sections SAS for read access to the second storage means 15. Resetting means 16 is further designed to reset the signal sections SAS containing noise signals PS1 or PS1, PS2 and/or PS3 that can be identified with the aid of the occurrence-detection data RD, and for lining up, without omissions, the remaining signal sections SAS, as a result of which a digital noise-signal-free audio signal DASO is formed. It should be mentioned in this context that the supply means 14 may also be designed to replace the signal sections SAS containing noise signals PS1 and/or PS2 and PS3. It may, for example, be provided that these signal sections SAS are replaced with signal sections SAS representing a zero signal, the signal level of which represents silence. It may further be provided, for example, that these signal sections SAS are replaced with signal sections having an artificially generated background signal.

Device 1 is further equipped with delivery means 17, which is designed to receive the noise-signal-free audio signal DASO and, using the noise-signal-free signal DASO, to generate and deliver an acoustic audio signal ASO.

Device 1 is further equipped with interface means 18, which is designed to receive the decompressed audio signal EAS and to deliver the decompressed audio signal EAS in the form of an electrical signal to an appliance, not shown in FIG. 1, that can be connected to the interface means 18.

Device 1 is further equipped with control means 19, which is designed to control the reception means 2, the compression means 3, the decompression means 5, the noise-signal detection means 6, the supply means 14, the delivery means 17 and the interface means 18. To this end, control means 19 is connected to the means 2, 3, 5, 6, 14, 17 and 18. Control means 19 is further designed to generate a control signal CS and to deliver this control signal CS to the means 2, 3, 5, 6, 14, 17 and 18. In the present case, control means 19 is designed to receive a control information that can be fed to it in a manual manner by means of a user operation. It should, however, be mentioned that control means 19 may also be designed to receive a control information that can be fed in by means of an infrared signal or a radio-frequency signal.

This gives rise to the advantage that, in the case of device 1, a detection and elimination of clicking noise signals PS1 or PS2 and PS3 that are disturbing to a user of device 1 can be undertaken in a reliable manner.

Figure 6:
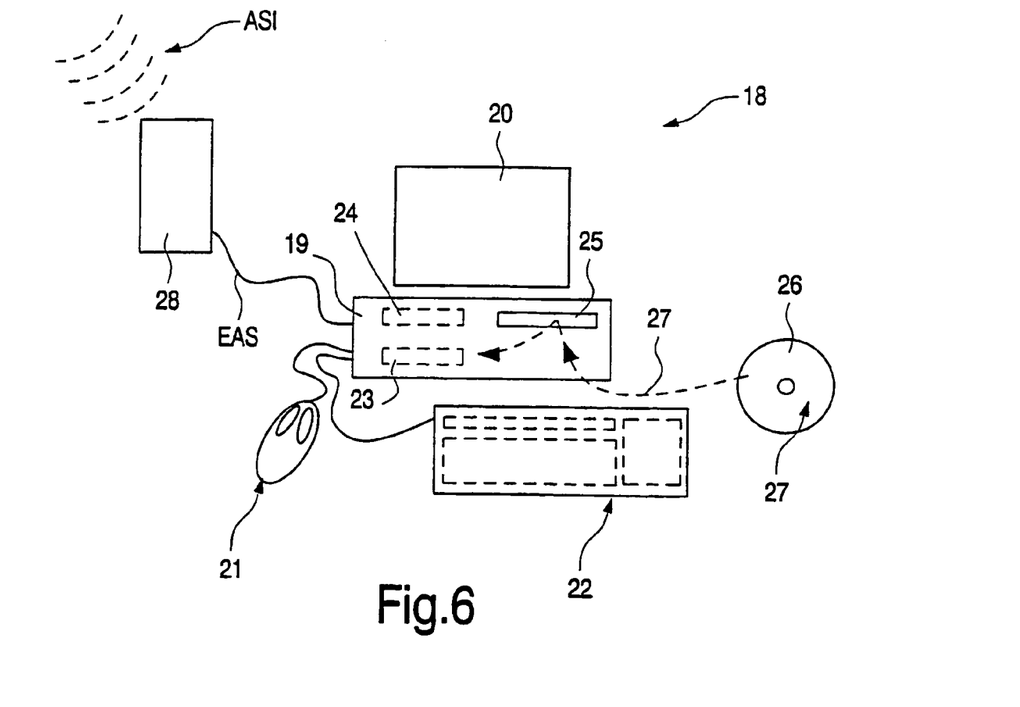
FIG. 6 shows, in the form of a block circuit diagram, a data processing system equipped with a computer in accordance with the invention, with which clicking noise signals are detectable in a digital audio signal with the aid of a computer program product in accordance with the invention.

FIG. 6 shows a data processing system 18, equipped with a computer 19 and a monitor 20 connected to computer 19, which serves as the visual user interface, and a mouse 21 connected to computer 19, and a keyboard 22 connected to computer 19, wherein the mouse 21 and the keyboard 22 serve as a manual user interface. Computer 19 can be operated with the aid of the user interfaces by a user not shown in FIG. 6. Computer 19 is further equipped with an internal memory 23, which is provided for the storage of processing data and/or of program data. The computer is further equipped with a processor unit 24, which is designed to interact with memory 23 and with the aid of which processor unit, using the program data, which program data can be implemented with the aid of the processor unit, the processing data can be processed. For the purpose of controlling computer 19, processor unit 24 is further designed to interact with the user interfaces 20, 21 and 22. Computer 19 is further equipped with a program data/processing data interface 25, with the aid of which access can be had to a computer-readable medium 26, which, in the present case, is realized by a compact disk, or CD for short.

Further connected to computer 19 is a mobile dictation machine 28, which is similar to the device 1 shown in FIG. 1, wherein the mobile dictation machine 28 is not equipped with the supply means 14 and the noise-signal detection means 6 of device 1, and wherein the digital, decompressed audio signal EAS can be fed directly to delivery means 17. It is further provided that, with the aid of an audio-signal interface of computer 19 not shown in FIG. 6, the digital audio signal EAS can be fed to computer 19 and can be stored in memory 23, so further processing with the aid of processor unit 24 is enabled.

To this end, a computer program product 27 can be fed to computer 19 via its program data/processing data interface 25 with the aid of the medium 26. Computer program product 27 can be loaded directly into the memory 23 of computer 19, and comprises software code sections, which software code sections form at least parts of the program data, wherein the method M can be implemented with computer 19 in order to detect the noise signal PS1 in accordance with FIG. 3 or the noise signals PS1, PS2 and PS3 in accordance with FIG. 4 in the digital audio signal EAS if computer program 27 is implemented on computer 19 with the aid of processor unit 24.

This gives rise to the advantage that, both in the case where the digital audio signal EAS is further processed on computer 19 with the aid of voice recognition software and in the case where the audio signal EAS is to be reproduced with the aid of computer 19, a reliable detection of a noise signal PS1 or, if applicable, PS2 or PS3 in the digital time representation of audio signal ASI is ensured.

It should be further mentioned that, in the case of device 1, the noise-signal detection means 6 and, if applicable, the supply means 14 may be provided between the reception means 2 and the compression means 3.

It should be further mentioned that, in the case of device 1, the means 6 and 14 may be provided between the means 5 and 18, so data representing a noise-signal-free, decompressed audio signal EAS can be delivered from device 1.

It should be further mentioned that medium 26 may be formed by a DVD or by an exchangeable hard disk or by a diskette.

It should be further mentioned that, in the case of device 1, at least components of the means 2, 17, 19 and 18 and the means 3, 4, 5, 6 and 14 are preferably realized as an integrated circuit.

It should be further mentioned that, in the case of the noise-signal detection means 6, a processing of signal sections SAS that are directly adjacent to one another, or of signal sections SAS that are not directly adjacent to one another may take place.

It should be further mentioned that the noise-signal detection means 6 may be equipped with third storage means 10, shown with broken lines in FIG. 2, for the temporary storage of data EVD and ETD, and that the energy-contents evaluation means 12 and the occurrence detection means 13 may be designed for accessing the stored data EVD and ETD and for processing this data EVD and ETD, as a result of which a non-realtime detection of noise signals is enabled.

It should be further mentioned that the noise-signal detection means 6 may also be designed for the dynamic division of audio signal EAS into signal sections SAS of differing signal-section durations in a range between two milliseconds and ten milliseconds as a function of properties of audio signal EAS.

The invention claimed is:

1. A method to detect at least one noise signal in a digital audio signal using at least one processor, the method comprising:

dividing the digital audio signal into a plurality of successive signal sections;

determining, by the at least one processor, an energy content for each of the plurality of successive signal sections;

comparing the energy content for each of the plurality of successive signal sections, to an energy threshold;

detecting, among the plurality of successive signal sections, at least one high-energy signal section having an energy content greater than the energy threshold, wherein the at least one high-energy signal section has at least one preceding signal section having an energy content less than the energy threshold and at least one following signal section having an energy content less than the energy threshold;

counting a first quantity of the at least one preceding signal section, a second quantity of the at least one high-energy signal section, and a third quantity of the at least one following signal section; and determining if the at least one high-energy signal section represents the at least one noise signal based, at least in part, on the first quantity, the second quantity, and the third quantity.

2. The method of claim 1, wherein the energy content for each of the plurality of successive signal sections is determined in accordance with the formula:

$$E = 10\log_{10}\left(\frac{1}{N}\sum_{k=1}^{N} S_k^2\right);$$

wherein $S_k$ represents magnitudes of signal amplitudes within each of the plurality of successive signal sections, and N represents a total number of signal amplitudes within each of the plurality of successive signal sections.

3. The method of claim 1, further comprising:

determining the energy threshold continuously from the digital audio signal based, at least in part, on a histogram method using the energy content calculated for each of the successive signal sections, a background level, and a ratio between a useful-signal level and a noise level of the digital audio signal.

4. The method of claim 1, wherein a duration of each of the successive signal sections is between two milliseconds and ten milliseconds.

5. The method of claim 1, wherein a duration of each of the successive signal sections is five milliseconds.

6. The method of claim 1, wherein it is determined that the at least one high-energy signal section represents the at least one noise signal when the first quantity is equal to or greater than 9, the second quantity is between 3 and 7, and the third quantity is equal to or greater than 30.

7. The method of claim 1, further comprising:

determining at least one additional high-energy signal section follows the at least one following signal section having an energy content less than the energy threshold;

wherein counting the second quantity comprises counting the at least one high-energy signal section and the at least one additional high-energy signal section.

8. An apparatus for detecting a noise signal in a digital audio signal the apparatus comprising:

a divider circuit configured to divide the digital audio signal into a plurality of signal sections;

a determination circuit configured to determine the energy content of the plurality of signal sections an evaluation circuit configured to evaluate the energy content of each of the plurality of signal sections relative to an energy threshold; and a detection circuit configured to detect, among the plurality of signal sections, the occurrence of:

at least one high-energy signal section having an energy content greater than the energy threshold, at least one preceding signal section preceding the at least one high-energy signal section and having an energy content less than the energy threshold, and at least one following signal section following the at least one high-energy signal section and having an energy content less than the energy threshold; and a counting circuit configured to count a first quantity of preceding signal sections, a second quantity of high-energy signal sections, and a third quantity of following signal sections.

9. The apparatus of claim 8, further comprising:

a supply circuit configured to supply an output audio signal, wherein the output audio signal comprises less noise than the digital audio signal.

10. The apparatus of claim 8, wherein one or more of the divider circuit, the determination circuit, the evaluation circuit, the detection circuit, and the counting circuit are implemented by at least one programmed processor.

11. The apparatus of claim 9, wherein the supply circuit is implemented by at least one programmed processor.

12. A computer-readable medium comprising a plurality of software code sections that, when executed by a computer, perform a method comprising:

dividing a digital audio signal into a plurality of signal sections;

comparing an energy content determined for each of the plurality of signal sections to an energy threshold;

detecting, among the plurality of signal sections, at least one high-energy signal section having an energy content greater than the energy threshold, wherein the at least one high-energy signal section has at least one preceding signal section having an energy content less than the energy threshold and at least one following signal section having an energy content less than the energy threshold;

counting a first quantity of the at least one preceding signal section, a second quantity of the at least one high-energy signal section, and a third quantity of the at least one following signal section; and determining if the at least one high-energy signal section represents at least one noise signal based, at least in part, on the first quantity, the second quantity, and the third quantity.

13. The computer-readable medium of claim 12, wherein the energy content for each of the plurality of signal sections is determined in accordance with the formula:

$$E = 10\log_{10}\left(\frac{1}{N}\sum_{k=1}^{N} S_k^2\right);$$

wherein $S_k$ represents magnitudes of signal amplitudes within each of the plurality of signal sections, and N represents a total number of signal amplitudes within each of the plurality of signal sections.

14. The computer-readable medium of claim 12, wherein the method further comprises:

determining the energy threshold continuously from the digital audio signal based, at least in part, on a histogram method using the energy content calculated for each of the signal sections, a background level, and a ratio between a useful-signal level and a noise level of the digital audio signal.

15. The computer-readable medium of claim 12, wherein a duration of each of the signal sections is between two milliseconds and ten milliseconds.

16. The computer-readable medium of claim 12, wherein a duration of each of the signal sections is five milliseconds.

17. The computer-readable medium of claim 12, wherein it is determined that the at least one high-energy signal section represents the at least one noise signal when the first quantity is equal to or greater than 9, the second quantity is between 3 and 7, and the third quantity is equal to or greater than 30.

18. The computer-readable medium of claim 12, wherein the method further comprises:
- determining if at least one additional high-energy signal section is present following the at least one following signal section having an energy content less than the energy threshold;
- wherein counting the second quantity comprises counting the at least one high-energy signal section and the at least one additional high-energy signal section, if present.

* * * * *